Figure 1:
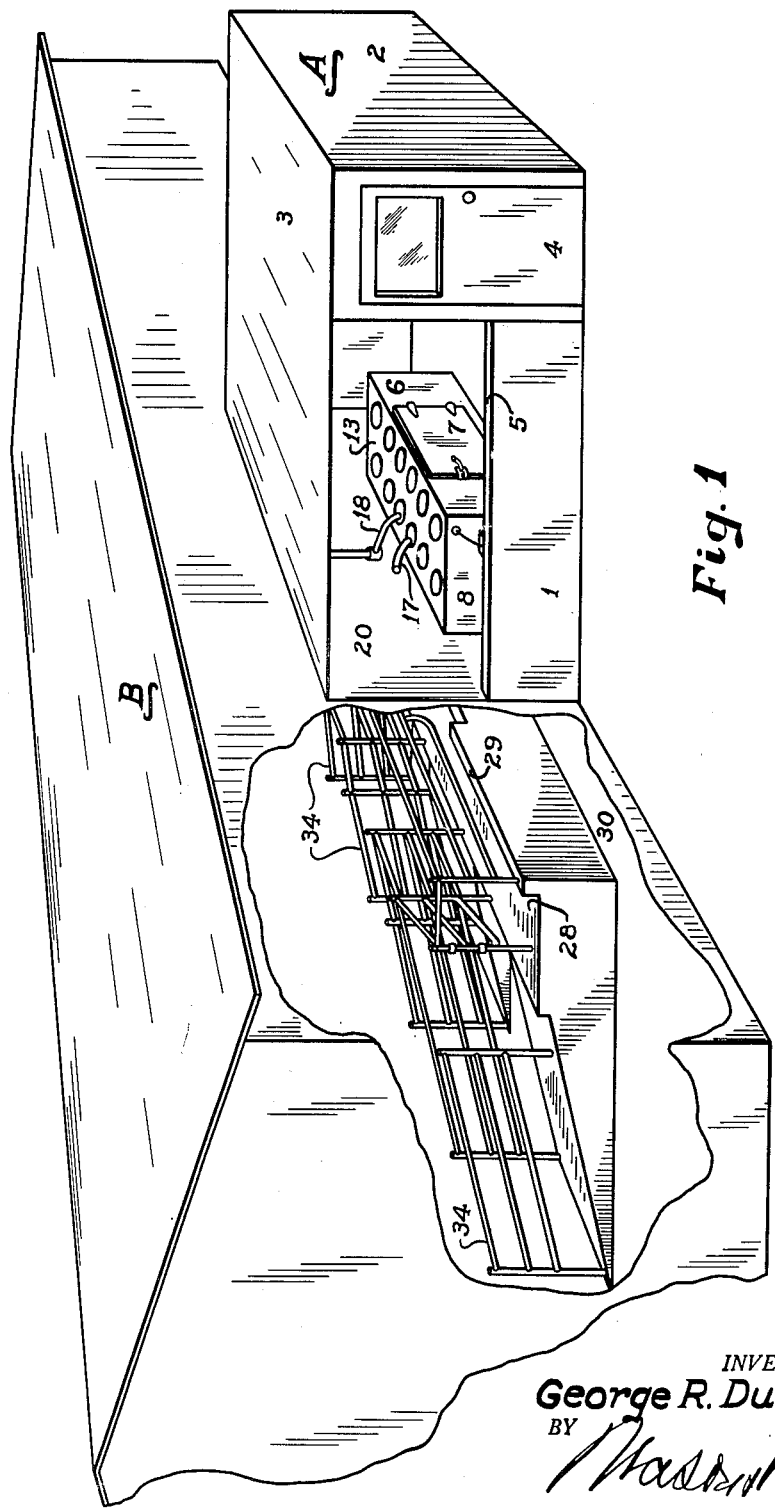

Nov. 11, 1952   G. R. DUNCAN   2,617,383
MEANS FOR MILKING AND HANDLING THE MILK OF FARM ANIMALS
Original Filed April 25, 1949   2 SHEETS—SHEET 1

INVENTOR.
George R. Duncan
BY
ATTORNEYS

Patented Nov. 11, 1952

2,617,383

UNITED STATES PATENT OFFICE 2,617,383

MEANS FOR MILKING AND HANDLING THE MILK OF FARM ANIMALS

George R. Duncan, Washington, Mo.

Original application April 25, 1949, Serial No. 89,374. Divided and this application June 15, 1950, Serial No. 168,241

16 Claims. (Cl. 119—14.03)

This invention relates to means for milking farm animals such as cows or goats, and handling milk in an expeditious and sanitary manner, such that the milk as it comes from the farm animals is untouched by human hands. The invention includes a structure for leading the animals to the milking stall means, and means for conducting the milk, as it comes from the animal, to a refrigerated container, which container is provided with means for cooling the milk and maintaining the milk at the proper temperature, say, about 33° F.

An object of the invention, therefore, is to provide a sanitary milking structure whereby the animals are led to the structure, are milked, and the milk is immediately conducted by a conduit from the teat cups, directly from the animal to a refrigerated container, without being touched by human hands.

Another object is to provide a structure where the animals are stationed while the milking operation proceeds, that is, separated by a wall or partition from the milk-containing and refrigerating means, with conduit means connected to the teat cups as attached to the animals, the conduit means extending from the cups through, or around, the wall or partition, to the milk can forming the container means, the latter being located in the refrigerating means.

A further object of the invention is to provide means for milking and for handling milk, which includes a milk house that is separated from the place where the animals are milked, the milk house containing the refrigerated container having a plurality of milk cans therein, and conduits from the cans leading out of the milk house to the milking machine that is located in the stalls where the animals to be milked are located.

An additional object of the invention is to provide a structure for expeditiously and hygienically handling the milking of a plurality of farm animals, whereby these animals, whether they be cows or goats, may be led to a milking barn or enclosure and secured in proper position for milking and in immediate proximity to a milk house that contains a refrigerated container in which are located conventional milk cans.

Yet another object of the invention is to provide a structure in accordance with the preceding paragraph, wherein flexible conduits are provided which connect the milking machine that is attached to the cow's udder, in order that milk may be drawn directly from the cow's udder into the milk cans or a single container located in the refrigerated container.

A further object of the invention is to provide, in a milking barn, means for causing one or more of the farm animals to be located in an elevated position during the milking operation and an aisle for the convenience of the milking operator located below this elevated position, whereby the teat cups can be readily attached to the cow's udder and one or more cows may be simultaneously milked in an expeditious and sanitary manner. The aisle is preferably located between a wall of the milk house and the elevated stand used by the farm animals while being milked.

Further objects will appear hereinafter throughout the specification.

Among the further objects which will be described herein are the following: the provision in a milking system, as hereinbefore described, of a meter which is so located as to measure the milk of the farm animal during the milking operation.

A weighing device which weighs the milk directly as it comes from the cow, and before it is led into the milk cans located within the refrigerating container.

The combination of a milking stall and milk house, the former constructed so as to permit the cow to be led into the milking parlor from one direction and led out of the same in another direction, and wherein the milk house is provided with a mechanical refrigerator adapted to hold a plurality of the milk cans.

Figure 2:
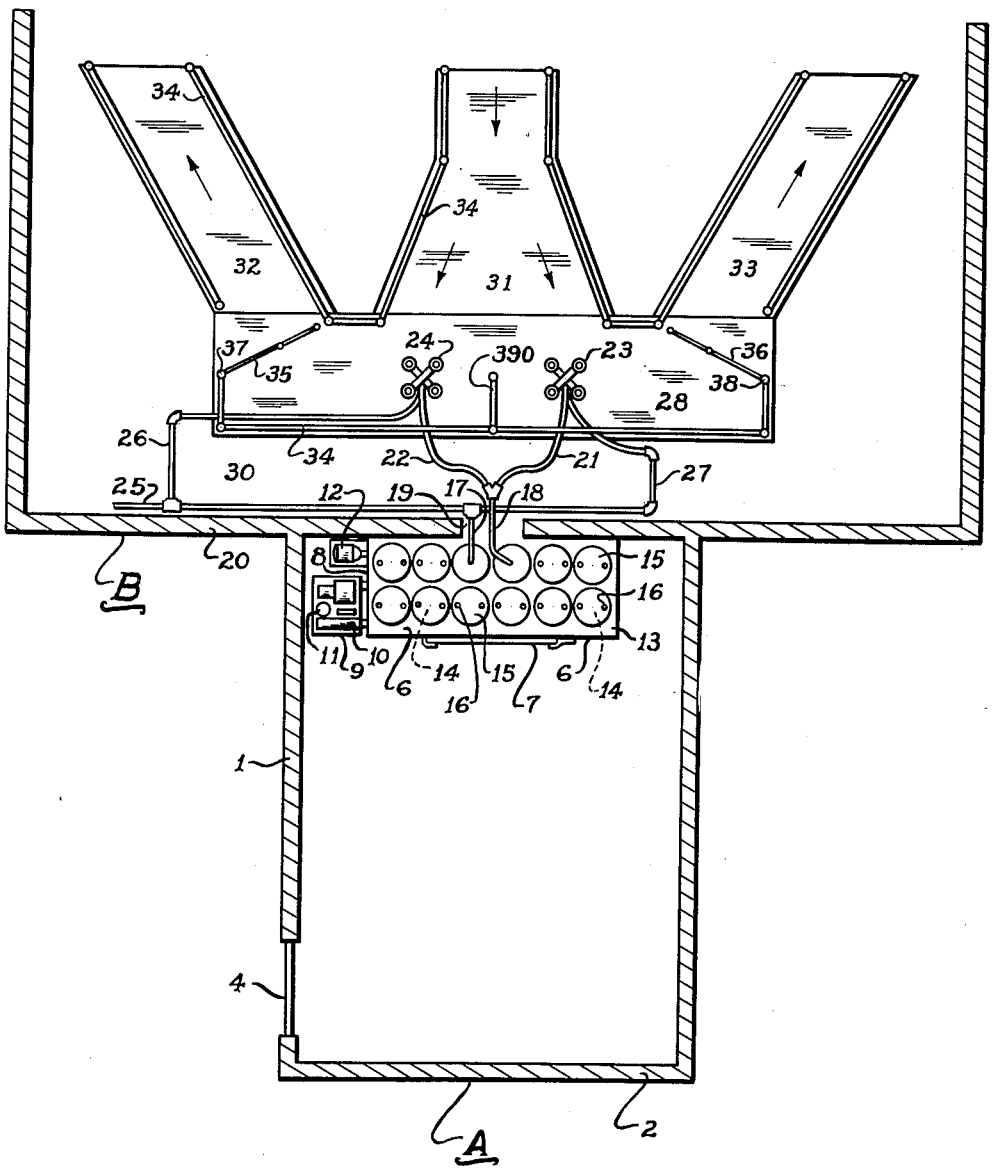

In the drawings:

Figure 1 is a perspective view of the barn with wall portions cut away, and the adjoining milk house, and Figure 2 is a horizontal section of the structure shown in Figure 1, with parts shown in plan.

Referring to Figures 1 and 2 of the drawings, the letter "A" designates the milk house and the letter "B" the barn. Neither the barn nor the milk house is essential in the combination, but it is preferable to provide a milk house for the protection of the refrigerating means and to enclose the milking stall structure shown in the drawings in some type of enclosure, in order to protect the animals, while being milked, from inclement weather conditions.

Referring to the milk house, the exact structure of which is of no particular importance, it will be noted that it is provided with walls 1 and 2 and a roof 3. Wall 1 may be provided with a door 4 and this wall is also provided with a viewing window 5, which may or may not be provided with glass.

Located within the milk house is a milk refrigerator 6 which is provided with a side door 7 for access to the interior thereof. Preferably mounted on one of the end walls 8 of the refrigerator is support 9 on which is located the refrigerating mechanism designated generally 10, and this mechanism has regulating means 11 whereby the temperature of the refrigerating coils may be adjusted, so as to raise or lower the temperature of the refrigerant. The refrigerator is preferably driven by the motor 12 which is connected by a suitable belt drive, not shown. It is, of course, obvious that a gas refrigerator, such as a "Servel" type, may be used in place of the motor-driven refrigerator shown.

The top of the refrigerator 13 is provided with a plurality of apertures 14 which are closed by covers 15, each cover preferably being provided with apertures 16 for connection of the milk pipes shown at 17 and 18. These two pipes extend, as shown in Figure 2, through an opening 19 in the wall 20 which is common to both the milk house and the barn. If no barn is used, the wall 20 forms one end of the milk house. As will be seen by referring to Figure 2, the milk line 18 has branches 21 and 22, each one of which leads to a plurality of teat cups 23 and 24. The vacuum line 25 is connected to a vacuum pump of a milking machine, not shown, and this pump may be of any suitable well-known type. The line 25 is provided with branches 26 and 27 which also lead to the teat cups 23 and 24. The line 17 is connected with line 25, as shown in Figure 2.

Provision is made for leading the farm animals, hereinafter referred to as cows, which are to be milked, up on the raised platform 28 having a curb 29, as seen in Figure 1. Between the platform 28 and the wall 20 is a passageway 30 forming the milker's station for the milking operator.

As seen in Figure 2 of the drawings, 31 is a ramp which forms an inlet for the cows. The present disclosure shows a layout for simultaneously milking two cows. The cows are positioned preferably facing in opposite directions, so that the teat cups 23 and 24 may be applied. After the milking operation is completed, the attendant, who occupies the passageway 30 forming the milker's station, detaches the teat cups 23 and 24 and opens the gates, hereinafter described, whereupon the cow which faces the exit ramp 32 uses this ramp, and the cow which faces the ramp 33 uses this ramp, to return to their respective stalls, or to the field. The three ramps 31, 32 and 33, and platform 28, are enclosed by suitable fence means, such as the piping 34 shown in the several figures. In order to maintain the cows in proper milking position during the milking operation, there are provided pivotal gates 35, 36, these gates being pivoted at 37, 38, respectively. As seen in Figure 2, the gates are in their closed position.

Referring, again, to the refrigerator, the same may be constructed in accordance with my Patent No. 2,425,519.

The pulsators of the milking machines are preferably located on the refrigerator, or on a post or the partition wall 20 or opening 19, so as to be at the back of the operator in aisle 30 when facing platform 28.

This application is a division of application Ser. No. 89,374, filed April 25, 1949, now Patent No. 2,512,094, and is an improvement of my application filed May 26, 1948, Ser. No. 29,336, now Patent No. 2,482,579, granted September 20, 1949.

In the refrigerators of my prior applications and patents the milk in the cans is preferably maintained at a temperature of 50° F., by means of water sprays, the water itself being maintained at the proper temperature by the refrigerating mechanism. Other refrigerating apparatus may be substituted for those disclosed in these applications and patents.

As disclosed in my Patent No. 2,498,401, granted February 21, 1950, the milk is caused to fill one can after another, whereby each of the cans, not shown, gradually becomes filled with milk as it comes from the cows.

The foregoing description of the invention is explanatory thereof and various changes in the size, shape, and of the materials used, as well as in the details of the illustrated construction, may be made, within the scope of the appended claims, without departing from the spirit of the invention.

I claim:

1. In a structure for milking farm animals and for conveying the milk to cooled milk container means as it comes from the animals comprising a platform having thereon means defining a pair of stalls for positioning two farm animals with their posteriors adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support milk container means, said mechanical milking means further including milk line means connected to each set of teat cups and leading into said refrigerator for connection to milk container means located within said refrigerator, a separate solid-partition, a milker's station located below and extending longitudinally of said platform and between the same and said solid-pattern, said solid-partition being located between said milker's station and said mechanical refrigerator.

2. In a structure for milking farm animals and for conveying the milk to cooled milk container means as it comes from the animals comprising a platform having thereon means defining a pair of tandem stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support milk container means, said mechanical milking means further including milk line means connected to each set of teat cups and leading into said refrigerator for connection to milk container means located within said refrigerator, a separate solid-partition, a milker's station located below and extending longitudinally of said platform and between the same and said solid-partition, said solid-partition being located between said milker's station and said mechanical refrigerator.

3. In a structure for milking farm animals and for conveying the milk to cooled milk container means as it comes from the animals comprising a raised platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support milk container means, said mechanical milking means further including milk line means connected to each set of teat cups and leading into said refrigerator for connection to milk container means located within said refrigerator, a separate solid-partition, a milker's station located below and extending longitudinally of said platform and between same and said solid-partition, said solid-partition being located between said milker's station and said mechanical refrigerator, said solid-partition having an opening and said milk line means extending through said opening to said refrigerator.

4. In a structure for milking farm animals and for conveying the milk to cooled milk container means as it comes from the animals comprising a raised platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support milk container means, said mechanical milking means further including milk line means connected to each set of teat cups and leading into said refrigerator for connection to milk container means located within said refrigerator, and a milk house having walls, one of said walls forming a solid-partition, a milker's station located below and extending longitudinally of said platform and between the same and said solid-partition, said mechanical refrigerator being located in said milk house and said solid-partition being located adjacent to and between said milker's station and said mechanical refrigerator.

5. In a structure for milking farm animals and for conveying the milk to cooled milk container means as it comes from the animals comprising a raised platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support milk container means, said mechanical milking means further including milk line means connected to each set of teat cups and leading into said refrigerator for connection to milk container means located within said refrigerator, and a milk house having walls, one of said walls forming a solid-partition, a milker's station located below and extending longitudinally of said platform and between the same and said solid-partition, said mechanical refrigerator being located in said milk house and said solid-partition being located adjacent to and between said milker's station and said mechanical refrigerator, said solid-partition having an opening and said milk line means extending through said opening to said refrigerator.

6. In a structure for milking farm animals and for conveying the milk to cooled milk container means as it comes from the animals comprising a platform having thereon means defining a pair of stalls for positioning two farm animals with their posteriors adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support milk container means, said mechanical milking means further including milk line means connected to each set of teat cups and leading into said refrigerator for connection to milk container means located within said refrigerator, a separate solid-partition, a milker's station located below and extending longitudinally of said platform and between the same and said solid-partition, said solid-partition being located between said milker's station and said mechanical refrigerator, and a plurality of ramps connected to said platform on opposite sides thereof from said milker's station.

7. In a structure for milking farm animals and for conveying the milk to cooled milk container means as it comes from the animals comprising a platform having thereon means defining a pair of divergent stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support milk container means, said mechanical milking means further including milk line means connected to each set of teat cups and leading into said refrigerator for connection to milk container means located within said refrigerator, a separate solid-partition, a milker's station located below and extending longitudinally of said platform and between the same and said solid-partition, said solid-partition being located between said milker's station and said mechanical refrigerator, and a plurality of ramps connected to said platform on opposite sides thereof from said milker's station.

8. In a structure for milking farm animals and for conveying the milk to cooled milk container means as it comes from the animals comprising a raised platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support milk container means, said mechanical milking means further including milk line means connected to each set of teat cups and leading into said refrigerator for connection to milk container means located within said refrigerator, a separate solid-partition, a milker's station located below and extending longitudinally of said platform and between same and said solid-partition, said solid-partition being located between said milker's station and said mechanical refrigerator, said solid-partition having an opening and said milk line means extending through said opening to said refrigerator, and a plurality of ramps connected to said platform on the opposite side thereof from said milker's station.

9. In a structure for milking farm animals and for conveying the milk to cooled milk container means as it comes from the animals comprising a platform having thereon means defining a pair of stalls for positioning two farm animals with their posteriors adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support milk container means, said mechanical milking means further including milk line means connected to each set of teat cups and leading into said refrigerator for connection to milk container means located within said refrigerator, a separate solid-partition, a milker's station located below and extending longitudinally of said platform and between the same and said solid-partition, said solid-partition being located between said milker's station and said mechanical refrigerator, a pair of exit ramps, each of said ramps being connected to an opposite end of said raised platform, and an inlet ramp connected to said platform between said exit ramps.

10. In a structure for milking farm animals and for conveying the milk to cooled milk container means as it comes from the animals comprising a platform having thereon means defining a pair of divergent stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support milk container means, said mechanical milking means further including milk line means connected to each set of teat cups and leading into said refrigerator, a separate solid-partition, a milker's station located below and extending longitudinally of said platform and between the same and said solid-partition, said solid-partition being located between said milker's station and said mechanical refrigerator, a pair of exit ramps, each of said ramps being connected to an opposite end of said raised platform, and an inlet ramp connected to said platform between said exit ramps.

11. In a structure for milking farm animals and for conveying the milk to cooled milk container means as it comes from the animals comprising a raised platform having thereon means defining a pair of stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support milk container means, said mechanical milking means further including milk line means connected to each set of teat cups and leading into said refrigerator for connection to milk container means located within said refrigerator, a separate solid-partition, a milker's station located below and extending longitudinally of said platform and between same and said solid-partition, said solid-partition being located between said milker's station and said mechanical refrigerator, said solid-partition having an opening and said milk line means extending through said opening to said refrigerator, a pair of exit ramps, each of said ramps being connected to an opposite end of said raised platform, and an inlet ramp connected to said platform between said exit ramps.

12. In a structure for milking farm animals and for conveying the milk to cooled milk container means as it comes from the animals comprising a platform having thereon means defining a pair of stalls for positioning two farm animals with their posteriors adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support milk container means, said mechanical milking means further including milk line means connected to each set of teat cups and leading into said refrigerator for connection to milk container means located within said refrigerator, a separate solid-partition, a milker's station located below and extending longitudinally of said platform and between the same and said solid-partition, said solid-partition being located between said milker's station and said mechanical refrigerator, and vacuum line means connected to said sets of teat cups between said operator's aisle and said mechanical refrigerator.

13. In a structure for milking farm animals and for conveying the milk to cooled milk container means as it comes from the animals comprising a platform having thereon means defining a pair of divergent stalls for positioning two farm animals with their backs adjacent and their udders in close proximity to each other, mechanical milking means including two sets of teat cups located in close proximity to each other adjacent the animals' udders whereby each set may be readily attached for milking the said pair of farm animals, a mechanical refrigerator adapted to support milk container means, said mechanical milking means further including milk line means connected to each set of teat cups and leading into said refrigerator for connection to milk container means located within said refrigerator, a separate solid-partition, a milker's station located below and extending longitudinally of said platform and between the same and said solid-partition, said solid-partition being located between said milker's station and said mechanical refrigerator, and vacuum line means connected to said sets of teat cups between said operator's aisle and said mechanical refrigerator.

14. In a structure for milking farm animals and for conveying the milk to milk container means as it comes from the animals comprising a platform having thereon means defining at least one pair of stalls for positioning a pair of farm animals with their posteriors adjacent and their udders in close proximity to each other, mechanical milking means including at least two sets of teat cups located in close proximity to each other adjacent the stalls whereby each set may be readily attached for milking the said pair of farm animals, a mechanical refrigerator having front, back and side walls, said refrigerator being adapted to support the milk container means, said mechanical milking means further including a milk line means connected to each set of teat cups and leading into said refrigerator for connection to the milk container means located within said refrigerator and means defining a milker's station between one of said refrigerator walls and said platform, said milker's station extending longitudinally of said platform.

15. In a structure for milking farm animals and for conveying the milk to milk container means as it comes from the animals comprising a platform having thereon means defining at least one pair of stalls for positioning a pair of farm animals with their posteriors adjacent and their udders in close proximity to each other, mechanical milking means including at least two sets of teat cups located in close proximity to each other adjacent the stalls whereby each set may be readily attached for milking the said pair of farm animals, a mechanical refrigerator having front, back and side walls, said refrigerator being adapted to support the milk container means, said mechanical milking means further including a milk line means connected to each set of teat cups and leading into said refrigerator for connection to the milk container means located within said refrigerator, means defining a milker's station between one of said refrigerator walls and said platform, said milker's station extending longitudinally of said platform, and ramp means connected to said platform.

16. In a structure for milking farm animals and for conveying the milk to milk container means as it comes from the animals comprising a platform having thereon means defining at least one pair of stalls for positioning a pair of farm animals with their posteriors adjacent and their udders in close proximity to each other, mechanical milking means including at least two sets of teat cups located in close proximity to each other adjacent the stalls whereby each set may be readily attached for milking the said pair of farm animals, a mechanical refrigerator having front, back and side walls, said refrigerator being adapted to support the milk container means, said mechanical milking means further including a milk line means connected to each set of teat cups and leading into said refrigerator for connection to the milk container means located within said refrigerator, means defining a milker's station between one of said refrigerator walls and said platform, said milker's station extending longitudinally of said platform, and a plurality of ramps connected to said platform at spaced intervals along the length thereof.

GEORGE R. DUNCAN.

REFERENCES CITED

The following references are of record in the file of this patent:

FOREIGN PATENTS

| Number | Country | Date |
|---|---|---|
| 14,887 | Great Britain | 1908 |

OTHER REFERENCES

Farm Implement and Machinery Review, Nov. 1, 1946, page 645.